(12) United States Patent
DiTullio et al.

(10) Patent No.: US 12,406,163 B2
(45) Date of Patent: Sep. 2, 2025

(54) QR REMOTE CONTROL

(71) Applicant: Atmosphere.tv, Austin, TX (US)

(72) Inventors: Jeff DiTullio, Austin, TX (US); Alen Durbuzovic, Austin, TX (US); Brent Hays, Austin, TX (US)

(73) Assignee: tmosphere.tv, Austin, TX (US)

( * ) Notice: Subject to any disclaimer, the term of this patent is extended or adjusted under 35 U.S.C. 154(b) by 0 days.

(21) Appl. No.: 18/299,370

(22) Filed: Apr. 12, 2023

(65) Prior Publication Data

US 2024/0346274 A1    Oct. 17, 2024

(51) Int. Cl.
*G06K 19/06*    (2006.01)
*G08C 17/02*    (2006.01)

(52) U.S. Cl.
CPC ....... *G06K 19/06037* (2013.01); *G08C 17/02* (2013.01); *G08C 2201/30* (2013.01); *G08C 2201/93* (2013.01)

(58) Field of Classification Search
CPC ........................... G06K 19/06037; G08C 17/02
USPC .......................................................... 235/494
See application file for complete search history.

(56) References Cited

U.S. PATENT DOCUMENTS

| | | | |
|---|---|---|---|
| 9,898,175 | B2 | 2/2018 | Fiedler |
| 11,244,561 | B1 * | 2/2022 | Fuchs ................... H04W 12/68 |
| 11,678,002 | B1 * | 6/2023 | Koopmans ....... H04N 21/42226 |
| | | | 725/38 |
| 2010/0153576 | A1 | 6/2010 | Wohlert et al. |
| 2013/0082827 | A1 | 4/2013 | Cho et al. |
| 2018/0176113 | A1 | 6/2018 | Thota |
| 2020/0186857 | A1 * | 6/2020 | Easley ............. H04N 21/25816 |
| 2022/0095006 | A1 * | 3/2022 | Seed ................... H04N 21/4788 |
| 2022/0311857 | A1 * | 9/2022 | Sweeney ........... H04M 1/72436 |
| 2023/0059126 | A1 * | 2/2023 | Arling ................. H04W 12/068 |
| 2023/0298089 | A1 * | 9/2023 | Peterson ............ G06Q 30/0641 |
| | | | 705/27.1 |

\* cited by examiner

*Primary Examiner* — Ahshik Kim (57) ABSTRACT

Systems and methods are disclosed for implementing a virtual remote control for a streaming content device based on a QR code associated with the streaming device. In certain embodiments, a method may comprise implementing a virtual remote control for a streaming device, including providing an interface for the virtual remote control to a user device over a network, receiving an input to the virtual remote control from the user device over the network, and adjusting a setting of the streaming device over the network based on the input.

18 Claims, 4 Drawing Sheets

QR REMOTE CONTROL

SUMMARY

In certain embodiments, a method may comprise implementing a virtual remote control for a streaming device, including providing an interface for the virtual remote control to a user device over a network, receiving an input to the virtual remote control from the user device over the network, and adjusting a setting of the streaming device over the network based on the input.

In certain embodiments, a system may comprise a streaming service configured to implement a virtual remote control for a streaming device at a user device, the streaming service physically remote from the user device and the streaming device. The streaming service may provide an interface for the virtual remote control to a user device over a network, receive an input to the virtual remote control from the user device over the network, and adjust a setting of the streaming device over the network based on the input.

In certain embodiments, a memory device may store instructions that, when executed, cause a processor to perform a method comprising implementing, via a streaming service physically remote from a user device and a streaming device, a virtual remote control for the streaming device at the user device. The streaming service may be configured for generating a quick response (QR) code associated with the streaming device, receiving metadata associated with the QR code from a user device over a network, in response to receiving the metadata, providing an interface for the virtual remote control to the user device over the network, receiving an input to the virtual remote control from the user device over the network, and adjusting a setting of the streaming device over the network based on the input.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
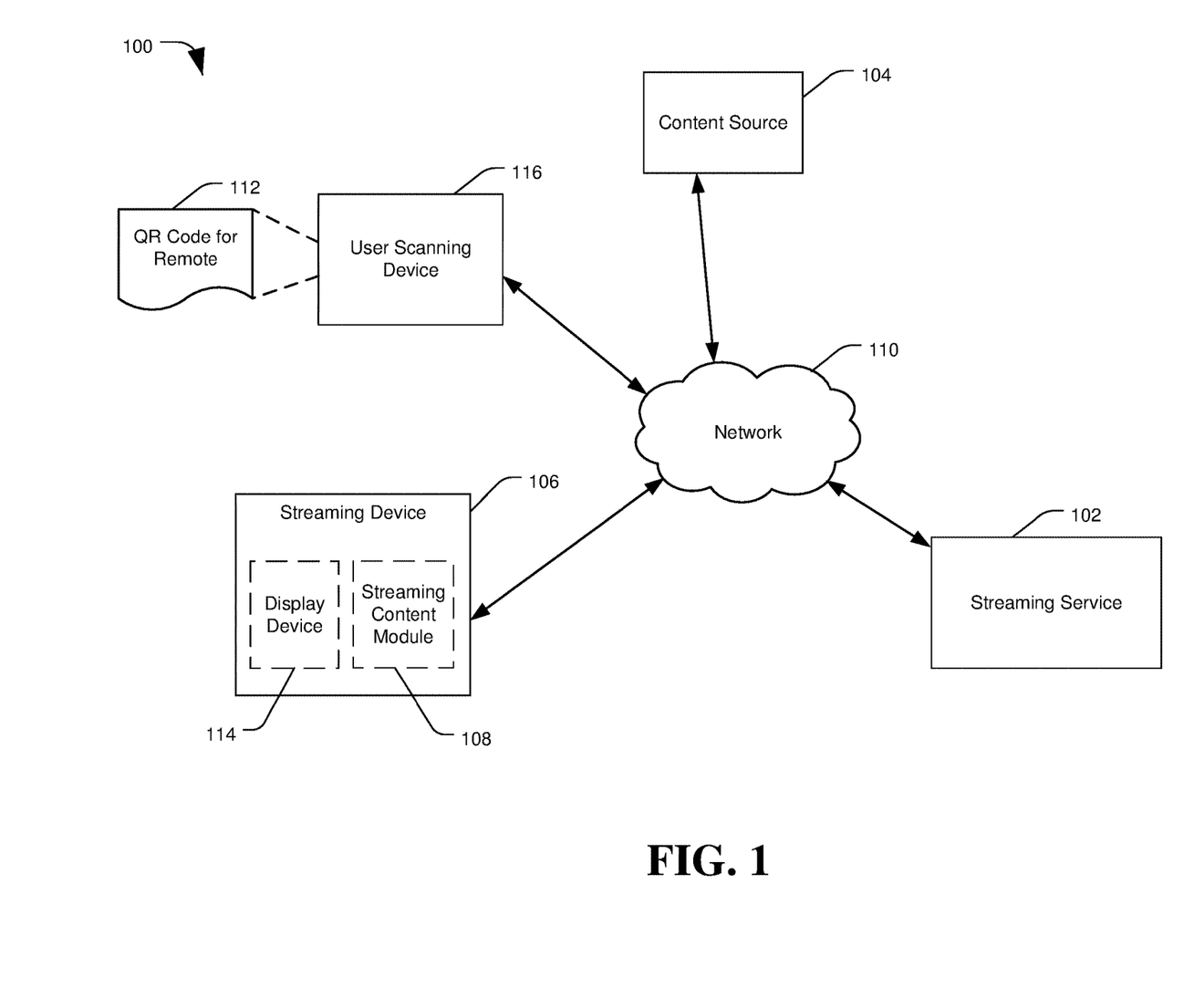
FIG. 1 is a diagram of a system configured to implement a QR (quick response) remote control, in accordance with certain embodiments of the present disclosure.

FIG. 1 depicts a diagram of a system 100 configured to implement a quick response (QR) remote control, in accordance with certain embodiments of the present disclosure. The system 100 may include a streaming service 102, a content source 104, a streaming device 106, a user scanning device 116, and a network 110 over which the components of system 100 may communicate and exchange data. Each or any of streaming service 102, content source 104, streaming device 106, user scanning device 116, and network 110 may be implemented via computers, servers, hardware and software modules, or other system components. Further, the system 100 may include a QR code 112 for accessing a remote control for controlling the playback of a stream over streaming device 106.

Streaming service 102 may generate, publish, or broadcast streaming content to streaming device 106. Some or all of the content, such as video segments or advertisements, may be obtained or transmitted from content source 104. Content source 104 may include one or more servers or databases providing content (e.g., video segments or streams, advertising, music, etc.) that may be displayed or presented at streaming device 106. In some embodiments, the streaming service 102 may acquire (e.g., download) content from content source 104 and generate streaming content to send to streaming device 106 over network 110. In some other embodiments, the streaming service 102 may provide content source 104 with a list or sequence of content elements to include in a content feed, and the streaming content can be provided from content source 104 to streaming device 106 via network 110. The streaming service 102 may provide a plurality of content feed options, such as multiple channels or content categories. Streaming service 102 may be configured with the capability to adjust or change behavior at the streaming device 106 (e.g., through commands sent via network 110) to change the channel or content feed displaying at the streaming device 106, adjust the volume or display settings, or otherwise modify the content being presented at streaming device 106. Further, streaming service 102 may include one or more data storage devices, data storage mediums, data storage servers, and related data structures, and may store information about streaming device 106 or associated client systems or accounts, streaming content data, or other information.

Streaming device 106, such as computers, smartphones, set-top boxes, or televisions, may receive streaming content such as video feeds. Streaming device 106 may include a streaming content module 108 and display device 114. Streaming content module 108 may receive streamed content, such as from streaming service 102 or content source 104 via network 110, and perform any data conversion necessary to display the streaming content on display device 114. In some examples, streaming content module 108 may also generate or load content to display with a stream, such as advertisements. Display device 114 may be a television, monitor, digital billboard, computer, smartphone, or other device having a digital display element. In some examples, a business may stream content to a television or video display device 114 at the business location (e.g., at a bar or restaurant) for the entertainment of customers. Streaming content may include both video segments and advertisements, as well as supplemental overlay data, such as news tickers, sports scores, stock market updates, a listing of current or upcoming video segments, or other data.

Streaming device 106 may be configured to be controlled via one or more local control options, such as a physical remote control, control elements on the streaming device itself, or other local inputs. As used herein, local controls or local inputs may include control devices physically proximate to the streaming device 106, which may send inputs from the control device to the streaming device 106 via wired electrical connections, infrared signals, Bluetooth, local Wi-Fi, radio frequency, or other limited-range transmission options.

However, physical control devices such as remote controls may be lost or stolen, and may be costly or difficult to replace. While a control device is lost, it may be difficult or impossible to control the streaming device 106. Even when a local remote is available, it may operate by bringing up a channel guide or menus on the display device 114, which may be intrusive or undesirable, especially when the display device 114 is displayed at a public business for customer entertainment. Further, a local control device may limit the ability to adjust the streaming device 106 remotely. For example, a business owner may have a streaming device 106 set at a business location, and may desire to adjust what is being displayed at the business location without physically traveling to the business location.

As an alternative to a local remote control, the system 100 may include a QR code 112 for accessing a remote control via a web application or other remote or online interface. In an example embodiment, a printout or physical element having a QR code 112 (or other scannable indicator) associated with streaming device 106 could be provided to a customer along with streaming device 106 or when signing up for a streaming product offered by streaming service 102. In another example, a component of system 100, such as streaming service 102 or streaming device 106, may dynamically generate a QR code 112 associated with streaming device 106, which code can be accessed by the customer. For example, the code may be sent (e.g., via a text message image or link, or via an email to a customer's account) or otherwise displayed (e.g., accessible via a customer account website), where the code may be scanned or printed for use by the customer. The QR code 112 may be generated, hosted, or otherwise presented via streaming service 102, content source 104, or via another component of system 100.

When a user scanning device 116 scans the QR code 112, the QR code 112 connect the user scanning device 116 with an application program interface (API) for the streaming service 102 via the network 110, e.g., by displaying a web link or directly initiating a network connection. The API may obtain information from the user scanning device 116, such as metadata that was included in the QR code 112. For example, the QR code may include a device identifier that uniquely identifies the streaming device 106. In some examples, the metadata included in the QR code 112 and provided by the user scanning device 116 may be encrypted or otherwise include security features (such as a randomly generated secure key, or requiring account log-in credentials) to indicate that the QR code is authenticated for providing control access to streaming device 106. The user scanning device 116 may include a smartphone, a tablet, a laptop, or another computing device capable of using an image capture element (e.g., a camera) to detect a scannable indicator and obtain data from it, such as a web address and metadata information. The user scanning device 116 may be internet- or network-capable, such as having cellular data capabilities or Wi-Fi connectivity, to access streaming service 102 via network 110.

In response to the user scanning device 116 contacting the API based on the QR code 112, the API can determine the streaming device 106 associated with the QR code, and may generate or direct the user scanning device 116 to a web-based remote control interface. For example, a WebView remote control may be presented at the user scanning device 116. The web-based remote control may be linked, via streaming service 102, to a specific streaming device 106, and may enable control of the streaming device via the streaming service and network 110. In this manner, a user may be able to control the content channel or other settings of the streamed content presented via the streaming device without the constraints of a local control device.

The web-based remote control may present a user with a control interface, e.g. via user streaming device 116 through an application or web browser, that allows for changing or selecting a content channel, volume control, adjusting settings such as closed captions, or otherwise adjusting the display elements for the streaming device 106. In some embodiments, the web-based remote may depict a channel guide for selecting a content or stream channel without the need to display the guide on the display device 114.

Further, a customer of streaming service 102 may manage the creation or invalidation of QR codes 112 via a remote interface, such as an account webpage or app, via user scanning device 116 or another computing device. For example, a user may request to have a QR code 112 associated with the streaming device 106 be generated. In response to a QR code generation request, the streaming service 102 may generate a QR code 112 associated with (and therefor providing control for) a selected streaming device 106 by including metadata such as a device ID, and a randomly or dynamically generated key. The streaming service 102 may store a copy or pair of the key (e.g., for a symmetric key pair) at the streaming service, so that API requests due to a scanning device 116 scanning the QR code 112 can be validated and grant access to the streaming device 106. In another example, a user may select to have an existing QR code 112 associated with a streaming device 106 invalidated or dissociated with the streaming device, for example in the event the QR code is compromised or lost. An example implementation of system 100 is discussed in more detail in regard to FIG. 2.

Figure 2:
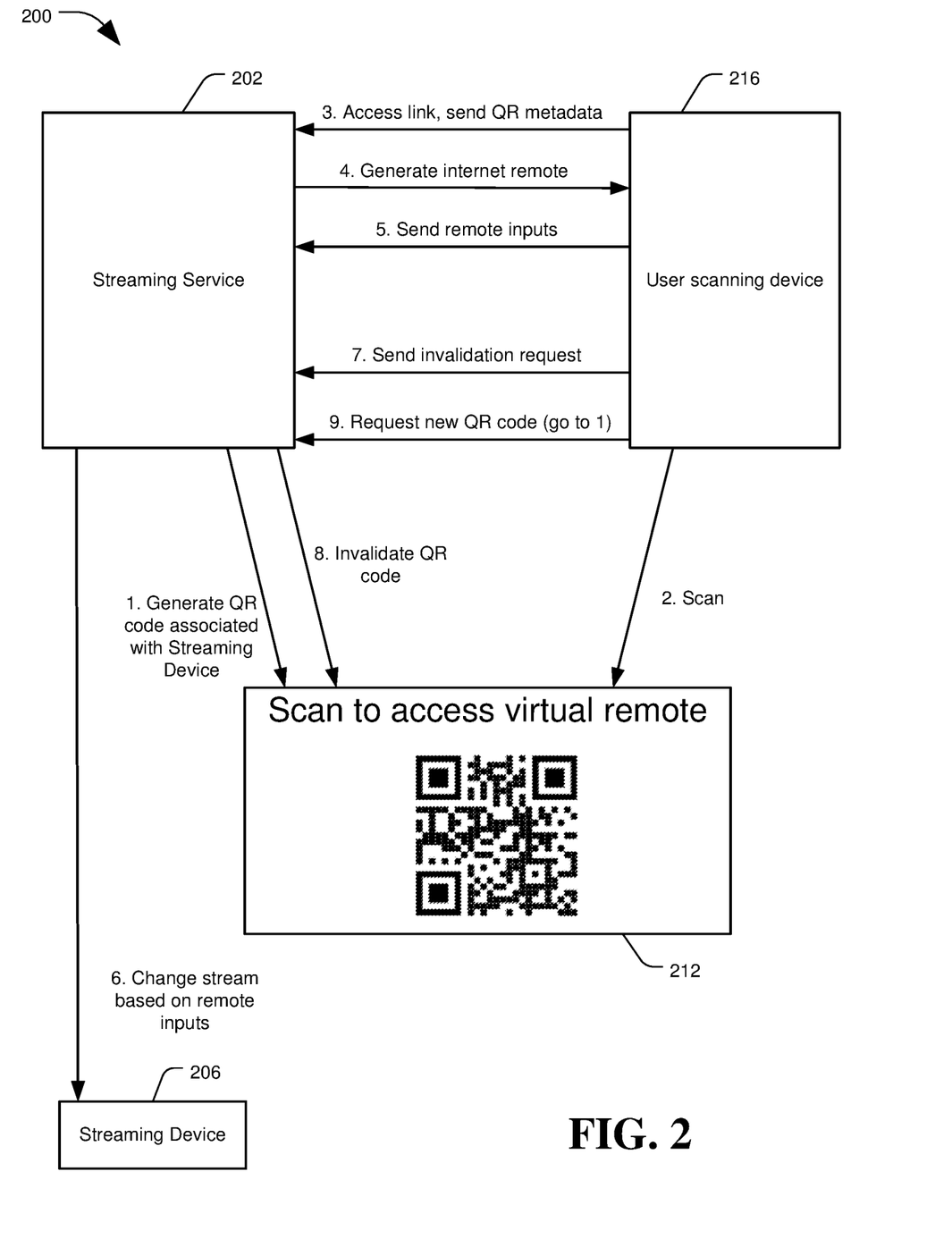
FIG. 2 is a diagram of a system configured to implement a QR remote control, in accordance with certain embodiments of the present disclosure.

FIG. 2 depicts a diagram of a system 200 configured to implement a QR remote control, in accordance with certain embodiments of the present disclosure. In particular, FIG. 2 presents an example embodiment of a streaming service system configured to utilize QR codes to access web-based remote controls for streaming content. System 200 may include a streaming service 202, a streaming device 206, a user scanning device 216, and a scannable indicator such as a QR code 212. In some embodiments, the system 200 of FIG. 2 may correspond to the system 100 of FIG. 1.

Streaming device 206 may be a computing device configured to receive streaming content over a network, and display the stream on a display device 114. The streaming device may include a set-top box or streaming stick, a smartphone, a gaming console, a smart TV, or any other device capable of the described operations. The streaming content may be received from a remote source, such as streaming service 202 or content source 104.

The streaming service 202 may generate a QR code 212 associated with a streaming device 206, at step 1. The streaming service 202 may generate the QR code 212 in response to a request from a user (e.g., through an account page on a website or app, via a request submitted through a call, email, text, or mailing, or via other means) or automatically (e.g., based upon initial account creation or to accompany a streaming device 206 delivered to a customer). The QR code 212 may be associated with the streaming device 206 by including metadata in the QR code that corresponds to a device ID or user account stored at the streaming service 202. Accordingly, when a user scanning device 216 scans the QR code 212, the streaming service 202 may use the metadata transmitted from the scanning device to identify and transmit commands to a particular streaming device (e.g., via network 110). The generated QR code 212 may also include security features in the metadata such as keys or encryption, which may enable the streaming service 202 to authenticate or verify the QR code 212. If a QR code 212 needs to be invalidated or dissociated from a user account or streaming device 206, the associated key(s) or encryption may be removed from the streaming service 202 so that the QR code is no longer recognized as valid. New key(s) or encryption may be generated for replacement QR codes 212. The generated QR code 212 may be provided to a customer or user via a physical printout or display (e.g., which may be included in packaging with the streaming device 206 or mailed), or as a digital web page or image which a customer or user may access through an account page, internet link, streaming service application, or other method.

A user scanning device 216 may scan the QR code 212 at step 2. For example, the user scanning device 216 may include a smartphone or tablet having a camera and software that can detect the QR code 212 and extract metadata encoded within the QR code. The QR code 212 may include an internet link directing the user scanning device 216 to access a web page or API associated with the streaming service 202. At step 3, the user scanning device 216 may access the link from the QR code 212, and may provide or transmit metadata from the QR code to the API, such as encrypted data, one or more keys, a device ID associated with streaming device 206, or other metadata elements.

In response to the metadata from the QR code 212, the streaming service 202 may verify or authenticate the QR code or the user device 216 that transmitted the data, and generate a web-based or virtual remote control, at step 4. The virtual remote control may be presented or generated within an application running on the user scanning device 216, such as a web browser or through an app associated with the streaming service 202 (e.g., as a WebView remote control). The virtual remote control may be connected, via the streaming service 202, to the streaming device 206 associated with the QR code 212, so that inputs to the virtual remote control affect the streaming device 206.

At step 5, the user scanning device 216 may send remote control inputs to the streaming service 202. For example, the web-based remote control may accept touchscreen or other inputs to enable a user to change a channel, turn the streaming device 206 on or off, or adjust volume or other settings. These inputs may be received at scanning device 216 and converted into network message packets, which may be sent over network 110 to streaming service 202.

Based on the received remote inputs, the streaming service 202 may change the stream content, channel, or other settings at the streaming device, at step 6. For example, input messages received at the streaming service 202 from the user scanning device 216 may be identified as corresponding to a particular streaming device 206 based on the virtual remote interface. The received messages may either be forwarded from the streaming service 202 to the streaming device 206, where they may be unpacked and executed, or the input messages may be received and interpreted by the streaming service API 202, which may then generate new messages (potentially in a different format) and send them to the streaming device. Messages or commands sent from streaming service 202 to streaming device 206 may be sent over network 110. In some examples, the streaming device 206 may return a response to the streaming service 202 indicating that a command was received or executed. The user scanning device 216 may continue sending remote inputs via the QR remote control as necessary, including scanning the QR code 212 again if the remote is closed, times out, or otherwise is lost at the scanning device 216 or the streaming service 202.

In an example embodiment, the QR code 212 may be lost or exposed to a person who should not have access to it. Accordingly, a user scanning device 216 or other computing device may transmit an invalidation request about the QR code 212 to the streaming service 202, at step 7. For example, a customer may access a user account page and request to invalidate all or selected QR codes associated with streaming device 206. In response to the invalidation request, the streaming service 202 may invalidate or dissociate the QR code 212 from streaming device 206, at step 8. For example, the streaming service 202 may delete one or more keys, unique identifiers, or other records of the QR code 212 stored at the streaming service, so that attempts to use the QR code to access a virtual remote for streaming device 206 will fail to be authenticated or validated.

After invalidating a QR code 212, or to obtain a first or new QR code 212 associated with streaming device 206, a user scanning device 216 or another computing device may request a new QR code, at step 9. The QR code generation request may initiate a new QR code generation process at step 1. An example method for implementing a QR remote control is discussed in regard to FIG. 3.

Figure 3:
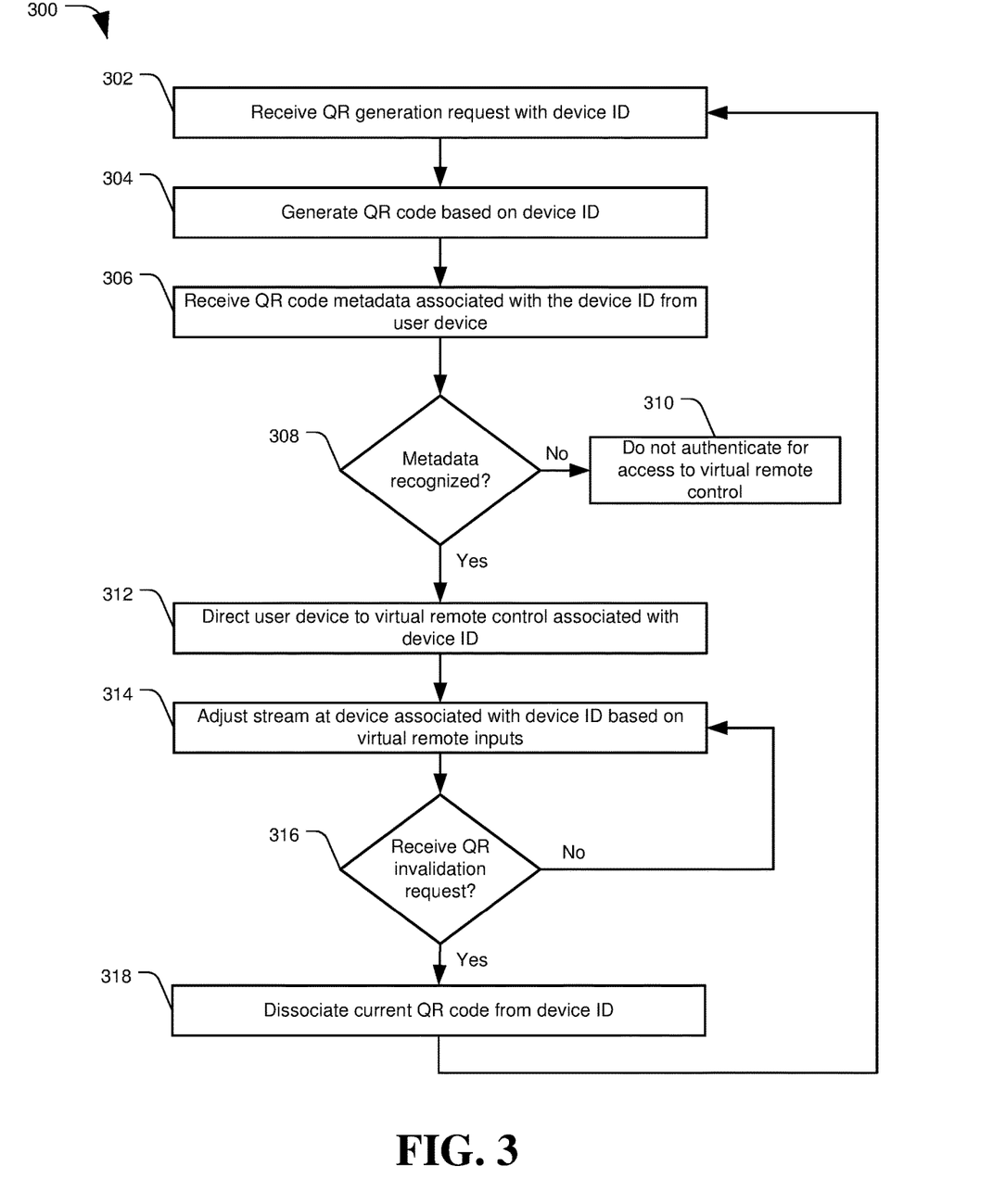
FIG. 3 depicts a flowchart of an example method for implementing a QR remote control, in accordance with certain embodiments of the present disclosure.

FIG. 3 depicts a flowchart 300 of an example method for implementing a QR remote control, in accordance with certain embodiments of the present disclosure. In particular, the method of FIG. 3 may be a process for creating a QR code that can be used to pull up a virtual or web-based remote control for controlling a streaming device or streaming content. The method of FIG. 3 may be implemented by systems shown in FIG. 1, such as streaming service 102, streaming device 106 and streaming content module 108, user scanning device 116, other components, or some combination thereof, generally collectively referred to as the streaming service 102.

The method may include receiving a QR code generation request, which request may include or be associated with a device ID for a particular streaming device, at 302. For example, a user may request generation of a remote control QR code via an application or web interface, where a corresponding device may be selected or a device ID may be entered. In another example, a streaming device may include a label, manual, or other printed element that may be scanned by a user scanning device, which may direct the scanning device to send a device ID and implement a QR code generation request.

In response to receiving the QR code generation request, the method may include generating a QR code based on the device ID, at 304. Generating the QR code may include generating one or more keys, code identifiers, or encrypting data in the QR code with a particular encryption scheme, and storing corresponding security data at the streaming service. The QR code security features and corresponding data stored at the streaming service may be used to validate or authenticate a scanning device for accessing a virtual remote control for the streaming device.

At 306, the method may include receiving QR code metadata associated with the device ID from the user scanning device. For example, scanning the QR code may direct the user scanning device to access an API for the streaming service and provide metadata included within the QR to the API. The method may then determine whether the metadata is recognized or authenticated, at 308. For example, the API may use the metadata to look up authorization data and an associated streaming device stored at the streaming service. If the metadata is not recognized or does not correspond to stored data, it may indicate that the scanned QR code has been invalidated, and the method may include not authenticating the user scanning device for access to a virtual remote control, at 310.

When the metadata is recognized or authenticated, at 308, the method may include directing the user device to a virtual remote control associated with the device ID, at 312. For example, the streaming service API may generate an instance of a virtual remote tied to the streaming device at the user streaming device, or may direct the user device to a web-based implementation or application of a virtual remote.

At 314, the method may include receiving remote control inputs via the virtual remote, and adjust a stream or content at the device associated with the device ID based on the inputs. For example, the streaming service (e.g., via the API) may either forward authorized commands received from the user scanning device to the streaming device, or may receive and interpret the commands, and generate corresponding commands to send to the streaming device.

At 316, the method may include determining whether a QR code invalidation request has been received, such as through a streaming service application or web interface. If not, the method may include continuing to receive virtual remote inputs and adjusting the stream or streaming device settings, at 314. If an invalidation request has been received, the method may include dissociating or invalidating the current QR code from the associated device ID or streaming device, at 318. For example, the streaming service may mark keys or identification data associated with the QR code as invalid, or may delete the identification data so that an authentication attempt will fail. The method may then return to receiving any future QR code generation request, at 302.

Figure 4:
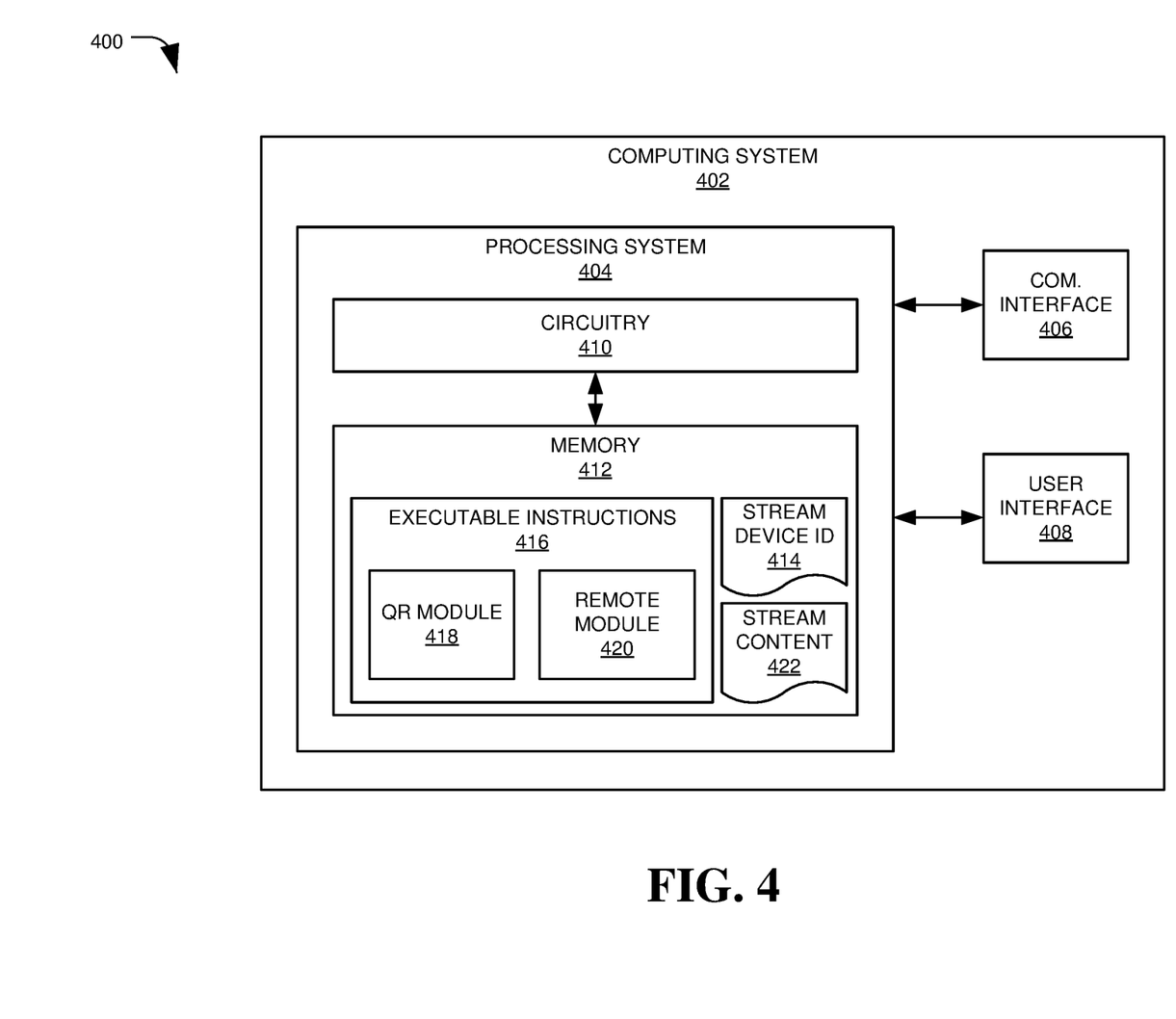
FIG. 4 is a diagram of a system configured to implement a QR remote control, in accordance with certain embodiments of the present disclosure.

Turning now to FIG. 4, a diagram of a system 400 configured to implement a QR remote control is shown, in accordance with certain embodiments of the present disclosure. In particular, FIG. 4 depicts a computer system 402, which may be an example of any computing system that may be employed to perform the operations of streaming service 102, content source 104, streaming device 106 or streaming content module 108, user scanning device 116, and related processes and methods. Computing system 402 may include a processing system 404, a communication interface 406, and a user interface 408. Computing system 402 may include other components, such as a battery and enclosure, that are not shown for clarity. Computing system 402 may comprise one or more server computing systems, desktop computing systems, laptop computing systems, smartphone devices, tablet devices, set-top or streaming boxes, connected televisions, or any other computing system, including combinations thereof.

Communication interface 406 may comprise components that communicate over communication links, such as network cards, ports, radio frequency (RF), processing circuitry and software, or other communication components. Communication interface 406 may be configured to communicate over metallic, wireless, or optical links. Communication interface 406 may be configured to use Time Division Multiplex (TDM), Internet Protocol (IP), Ethernet, optical networking, wireless protocols, communication signaling, other communication formats, or any combinations thereof. In particular, communication interface 406 may be configured to communicate over a network 110 with streaming service 102, streaming device 106, content source 104, user scanning device 116, or other external systems. Communication interface 406 may also enable communication with local external devices, such as external storage or interface devices.

User interface 408 may comprise components that interact with a user to receive user inputs and to present media or other information. User interface 408 may include a display screen, touch screen, touch pad, keyboard, buttons, speaker, microphone, pointer device or interface, communication port, other user input/output apparatus, or any combination thereof. User interface 408 may also include camera or image capture apparatus for scanning elements such as QR codes. In some examples, user interface 408 may be a module configured to interface with a separate system for presenting information and receiving inputs. For example, computing system 402 may have limited or no direct user input components, but it connects (e.g., via communication interface 406) to a monitor or other device that may receive inputs via touch screen, remote control, or other input method, which inputs are then provided or relayed to computing system 402.

Processing system 404 may be linked to communication interface 406 and user interface 408. Processing system 404 can include processing circuitry 410 and memory device 412. Memory device 412 can store executable instructions or other operating software 416, as well as non-executable data files, such as stream device identifier (ID) data 414 or security or authorization data, and stream content 422. Stream device ID 414 may include a unique identifier for one or more streaming devices, keys, or other identifiers which may be incorporated into generated QR codes for generating or authorizing virtual remote controls. For example, a streaming service may maintain device IDs 414, keys, encryption information, or other identifiers associated with multiple client streaming devices, and may generate QR codes for generating virtual remote controls associated with those devices. Stream content 422 may include video, audio, advertising, or other content of a content stream, which may be provided from streaming service 102 or content source 104 to streaming device 106.

Processing circuitry 410 may comprise a microprocessor and other circuitry that can retrieve and execute instructions 416 from memory device 412. Memory 412 may comprise a non-volatile data storage medium, such as a disk drive or solid state drive, or volatile memory such as random access memories (RAM) and dynamic RAM (DRAM), or any other memory apparatus. In some examples, processing circuitry 410 may be mounted on a circuit board that may also hold memory device 412 and portions of communication interface 406 or user interface 408.

Executable instructions 416 may comprise computer programs, firmware, or some other form of machine-readable processing instructions. Executable instructions 416 may include QR module 418, and remote module 420, although related operations may be handled by multiple different modules or programs (potentially located on multiple computing devices), all operations may be performed by a single module, or additional modules may be included in executable instructions 416. For example, elements or aspects of QR module 418 and remote module 420 may be implemented by streaming service 102, streaming device 106 or streaming content module 108, user scanning device 116, other systems, or a combination thereof. Executable instructions 416 may further include an operating system, utilities, drivers, network interfaces, applications, or other types of software. When executed by processing circuitry 410, executable instructions 416 may direct processing system 404 to operate computing system 402 as described herein.

QR module 418 may be a set of instructions for generating QR codes, validating or authorizing QR code metadata received from user devices, or both. In some examples, QR module 418 may also transmit QR codes to user devices, or link user devices to web pages or applications where QR codes may be accessed. The QR module 418 may include a streaming device ID received from a user device or retrieved from stream device ID 414 into the QR code. The QR module 418 may also randomly or dynamically generate keys, QR code identifiers, encryption algorithms, or other data which may be used for authenticating a remote control QR code, and storing data (e.g., to stream device ID 414) that may be used to verify or authenticate the generated keys, etc. in a manner that associates particular QR code metadata with a particular streaming device. When a transmission is received from a user scanning device after scanning a QR code, the QR module 418 may compare the received metadata against the stream device ID 414 to determine whether a virtual remote control may be generated for controlling a particular streaming device. If a QR code invalidation request is received, the QR module 418 may delete, invalidate, or dissociate keys or validation information, so that the associated QR code cannot be used to generate a virtual remote control.

Remote module 420 may include a set of computer functions or instructions for generating a virtual remote control that may be accessed via a user streaming device. For example, when a user streaming device scans a QR code for a remote and accesses an API for the streaming service, the QR module 418 may first validate the QR code, and then direct the remote module 420 to generate or direct the user scanning device to a virtual remote that can control a particular streaming device, or the content provided to the streaming device. The remote module 420 may receive inputs to the virtual remote, and based on those inputs, may alter what stream content 422 is provided to a streaming device, or may send instructions to the streaming device to change a channel, adjust a setting, or otherwise alter its operation.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g., steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   implementing a virtual remote control for a streaming device, including:
   providing an interface for the virtual remote control to a user device over a network, including:
   generating a quick response (QR) code associated with the streaming device;
   receiving metadata associated with the QR code from the user device; and
   providing the interface in response to receiving the metadata;
   receiving an input to the virtual remote control from the user device over the network; and
   adjusting a setting of the streaming device over the network based on the input, including changing a channel playing at the streaming device.

2. The method of claim 1 further comprising:
   receiving a QR code generation request; and
   generating the QR code based on the QR code generation request.

3. The method of claim 1 further comprising:
   generating the QR code to include the metadata, the metadata including a dynamically generated key;
   based on receiving the metadata from the user device, authorizing the metadata; and
   providing the interface based on authorizing the metadata.

4. The method of claim 3 further comprising:
   receiving an invalidation request for the QR code; and
   invalidating the QR code, resulting in the metadata not being authorized for accessing the interface.

5. The method of claim 1 further comprising:
   implementing the virtual remote control via a streaming service physically remote from the user device and the streaming device.

6. The method of claim 1 further comprising the interface includes a channel guide displayed at the user device and not displayed via the streaming device.

7. A system comprising:
   a streaming service configured to implement a virtual remote control for a streaming device at a user device, the streaming service physically remote from the user device and the streaming device, including:
   generate a quick response (QR) code associated with the streaming device;

in response to the QR code being scanned by the user device, provide an interface for the virtual remote control to the user device over a network;
receive an input to the virtual remote control from the user device over the network; and
adjust a setting of the streaming device over the network based on the input.

8. The system of claim 7 comprising the streaming service further configured to:
receive metadata associated with the QR code from the user device when the QR code is scanned by the user device; and
provide the interface in response to receiving the metadata.

9. The system of claim 8 comprising the streaming service further configured to:
receive a QR code generation request; and
generate the QR code based on the QR code generation request.

10. The system of claim 8 comprising the streaming service further configured to:
generate the QR code to include the metadata, the metadata including a dynamically generated key;
based on receiving the metadata from the user device, authorize the metadata; and
provide the interface based on authorizing the metadata.

11. The system of claim 10 comprising the streaming service further configured to:
receive an invalidation request for the QR code; and
invalidate the QR code, resulting in the metadata not being authorized for accessing the interface.

12. The system of claim 7 comprising the streaming service further configured to:
adjust the setting by changing a channel playing at the streaming device.

13. The system of claim 12 comprising the streaming service further configured to:
provide the interface to include a channel guide displayed at the user device and not displayed via the streaming device.

14. A memory device storing instructions that, when executed, cause a processor to perform a method comprising:
implementing, via a streaming service physically remote from a user device and a streaming device, a virtual remote control for the streaming device at the user device, including:
generating a quick response (QR) code associated with the streaming device;
receiving metadata associated with the QR code from a user device over a network;
in response to receiving the metadata, providing an interface for the virtual remote control to the user device over the network, wherein the interface includes a channel guide displayed at the user device and not displayed via the streaming device;
receiving an input to the virtual remote control from the user device over the network; and
adjusting a setting of the streaming device over the network based on the input.

15. The memory device of claim 14 storing instructions that, when executed, cause the processor to perform the method further comprising:
receiving a QR code generation request; and
generating the QR code based on the QR code generation request.

16. The memory device of claim 14 storing instructions that, when executed, cause the processor to perform the method further comprising:
generating the QR code to include the metadata, the metadata including a dynamically generated key;
based on receiving the metadata from the user device, authorizing the metadata; and
providing the interface based on authorizing the metadata.

17. The memory device of claim 16 storing instructions that, when executed, cause the processor to perform the method further comprising:
receiving an invalidation request for the QR code; and
invalidating the QR code, resulting in the metadata not being authorized for accessing the interface.

18. The memory device of claim 14 storing instructions that, when executed, cause the processor to perform the method further comprising:
adjusting the setting includes changing a channel playing at the streaming device.

\* \* \* \* \*

UNITED STATES PATENT AND TRADEMARK OFFICE
CERTIFICATE OF CORRECTION

Page 1 of 1

PATENT NO. : 12,406,163 B2
APPLICATION NO. : 18/299370
DATED : September 2, 2025
INVENTOR(S) : Alen Durbuzovic, Jeff DiTullio and Brent Hays It is certified that error appears in the above-identified patent and that said Letters Patent is hereby corrected as shown below:

On the Title Page

Item (73), please list the Assignee as "Atmosphere.tv".

Signed and Sealed this
Third Day of February, 2026

John A. Squires
*Director of the United States Patent and Trademark Office*